United States Patent [19]

Yagi

[11] 4,360,764
[45] Nov. 23, 1982

[54] FLASH UNIT HAVING PLURAL FLASHLAMPS

[75] Inventor: Hideo Yagi, Tokyo, Japan

[73] Assignee: Kabushiki Kaisha Sunpak, Tokyo, Japan

[21] Appl. No.: 197,473

[22] Filed: Oct. 16, 1980

[30] Foreign Application Priority Data

Oct. 26, 1979 [JP] Japan .............................. 54-137581
Mar. 14, 1980 [JP] Japan .............................. 55-31550
Apr. 5, 1980 [JP] Japan .............................. 55-46008[U]
May 30, 1980 [JP] Japan .............................. 55-73995[U]

[51] Int. Cl.³ ........................................... H05B 41/34
[52] U.S. Cl. .................................. 315/151; 315/152; 315/241 P; 315/323
[58] Field of Search .............................. 354/145, 132; 315/151-154, 159, 241 P, 323-325

[56] References Cited
U.S. PATENT DOCUMENTS 3,590,314 6/1971 Krusche .......................... 315/152 X
3,912,968 10/1975 Nakamura ....................... 315/241 P
4,012,665 3/1977 Nakamura et al. ............. 315/151 X
4,242,616 12/1980 Takematsu ..................... 315/241 P Primary Examiner—Eugene R. LaRoche
Attorney, Agent, or Firm—Neuman, Williams, Anderson & Olson

[57] ABSTRACT

An electronic flash unit is disclosed which includes one flashlamp arranged to illuminate an object from the front side thereof and another flashlamp which is rotatably mounted and arranged to direct light at an angle such as to illuminate the object after reflection. Circuitry is provided for accurately controlling the relative illumination provided by the lamps and also for obtaining the optimum total exposure.

11 Claims, 6 Drawing Figures

FLASH UNIT HAVING PLURAL FLASHLAMPS

This invention relates to a flash unit having plural flashlamps and more particularly to a flash unit with which light may be produced uniformly and ubiquitously in a region to be photographed with the amount of light being accurately controlled. The unit of the invention is highly reliable in operation while using circuitry which is comparatively simple and which is readily and economically manufacturable.

BACKGROUND OF THE INVENTION

Illumination is very critical in photography and when a flashlamp is used, difficulties are encountered because of transmission of the light from only one direction. Professional photographers use a plurality of light sources to avoid such problems, sometimes using "bounce" lighting in which the light is directed toward a ceiling, wall or other object to be diffusely reflected toward the region to be photographed and to obtain a more uniform lighting with minimal shadows. Amateur photographers are not usually in a position to use plural light sources and have generally been limited to the use of a single source with consequent difficulties.

Automatic flash units are well-known in which the amount of light used to illuminate a region may be controlled automatically using a photometric device responsive to light reflected back from the region. It has been proposed to construct a flash unit with two flash sections which are turned on simultaneously with at least one of such sections being rotatable in a manner such that bounce lighting may be used. However, there are problems which are not fully recognized and dealt with with a device of this type as proposed. In particular, a fixed ratio between the bounce light and the direct light has been proposed such as a ratio of approximately four to one. It has been found, however, that with such a ratio, the effective value of the direct light may be much greater than that of the bounce light and the relative effect may also be changed with different conditions. In addition, it is not possible to reliably obtain the proper total amount of light with arrangements as heretofore proposed.

SUMMARY OF THE INVENTION

An object of the present invention is to provide an electronic flash unit having plural flashlamps and operative in a manner such as to avoid the aforementioned problems.

Another object of the invention is to provide such an electronic flash unit with means for adjusting the ratio of light emission between sections while at the same time obtaining accurate control of the total effective light.

In a flash unit constructed in accordance with this invention, a plurality of flashlamps are provided and are energized by circuit means including first means for terminating current to a first flashlamp and second means for terminating application of current to each additional flashlamp. The second means is operative to terminate application of current to the additional flashlamp or flashlamps prior to operation of the first means which is operative in response to a photometric output signal and which terminates application of current to the first flashlamp in response to refelection of a predetermined integrated value of light reflected from the region to be photographed. With this arrangement, plural light sources are energized, with bounce lighting if desired, and the total light directed toward the region to be photographed may be accurately controlled to obtain optimum results.

Either of the flashlamps may be used for direct illumination of the region to be photographed and the other flashlamp or flashlamps may be used for bounce illumination. In a preferred construction, one of the flashlamps is rotatably mounted for this purpose.

Preferably, the termination of current to the aforementioned additional flashlamp or flashlamps is effective in response to a photometric output signal and in response to an integrated value of reflected light which is substantially less than the aforementioned predetermined integrated value. Both values may preferably be adjustable to obtain optimum results under a wide range of conditions.

In preferred constructions of the unit, the flashlamps may preferably be energized sequentially, the aforementioned first flashlamp being energized after and in response to termination of current to the additional flashlamp or flashlamps.

Further features of the invention relate to circuitry for obtaining highly efficient energization of the flashlamps with components of minimum size and weight. In one embodiment, a single main capacitor is used for storing energy for energization of two flashlamps and after partial discharge through one flashlamp, it is connected in series with an auxiliary capacitor to apply current to the second flashlamp.

Other features relate to circuitry for insuring reliable operation under a variety of conditions, including rtimer circuitry for insuring application of current to all flashlamps and for terminating current at appropriate times even when the conditions are not such that the normal photometric output signals are obtained.

This invention contemplates other objects, features and advantages which will become more fully apparent from the following detailed description taken in conjunction with the accompanying drawings.

Figure 1:
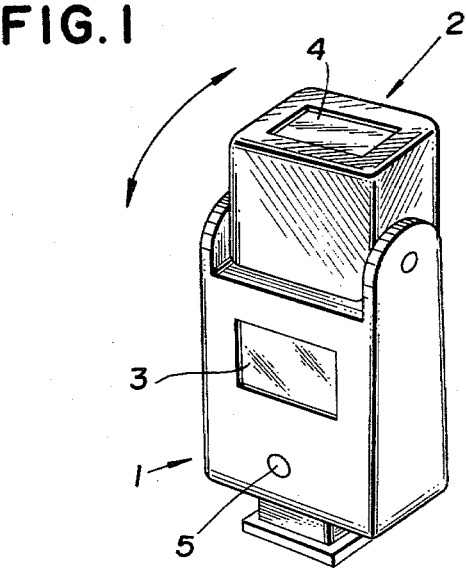
FIG. 1 is a perspective view of an electronic flash unit constructed in accordance with the invention.

FIG. 1 illustrates a flash unit constructed in accordance with the principles of this invention and designed for use with a camera, being attached to a camera if desired. The unit includes a fixed housing 1 and a swivel housing part 2 which is rotatably mounted by pivot means with respect to the fixed part 1. A one flashlamp together with a suitable reflector is mounted behind a window 3 in a front surface of the fixed part 1, and another flashlamp is mounted behind a window 4 in the swivelable part 2. In typical use, the window 3 is positioned facing to an object or region to be photographed so as to project the light generally horizontally. The window 4, on the other hand, is so mounted as to be rotatable to project light at an angle of up to approximately 90 degrees from the direction of projection from the window 3. It will be understood that the window 4 may be adapted to rotate for facing in other directions and, if desired, additional flashlamps and corresponding windows and housing parts may be provided.

Figure 2:
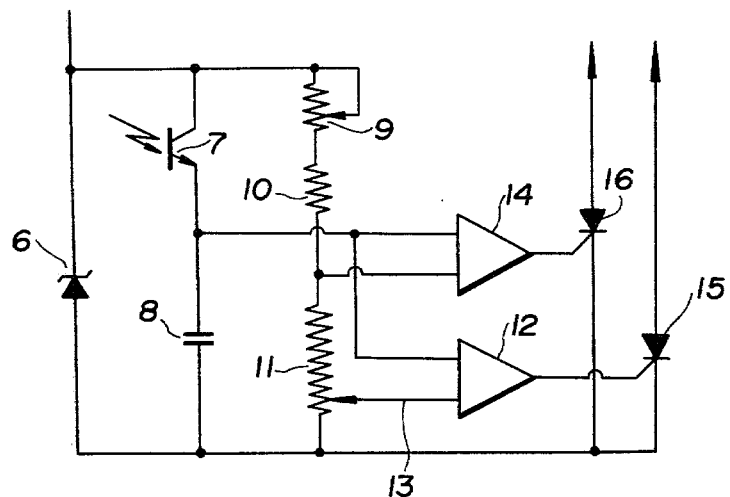
FIG. 2 is a circuit diagram of a photometric circuit for the unit of FIG. 1.

A light receiving window 5 is provided in the fixed part beneath window 3, the light reflected from the illuminated region being transmitted through window 5 to light-responsive means of a photometric circuit. The photometric circuit is shown in FIG. 2 and is supplied with a substantially constant operating voltage produced across Zener diode 6, a circuit which supplies a voltage to the diode 6 being shown in FIG. 4, as hereinafter described. A series circuit consisting of an integrating capacitor 8 and a phototransistor 7 is connected in parallel with the Zener diode 6, this circuit being adapted to convert the light transmitted through the light receiving window 5 into an electrical signal. A series circuit consisting of a variable resistor 9, a fixed resistor 10, and a potentiometer 11 is connected in parallel with diode 6 and in parallel to the series circuit of elements 9–11.

The voltage developed across the capacitor 8 is a function of the integrated value of light impinged on the phototransistor 7 after application of the supply voltage. The voltage so developed across capacitor 8 is applied to one input of a differential amplifier or comparator 12 having a second input connected through a line 13 to a slider or movable contact of the potentiometer 11. The output voltage developed across the capacitor 8 is also applied to one input of a second differential amplifier or comparator 14, the second input of which is connected to the junction between fixed resistor 10 and potentiometer 11. Thus, one reference voltage which is adjustable through adjustment of potentiometer 11 is applied through line 13 to comparator 12 and another reference voltage is applied to the comparator 14 which is higher than that applied to comparator 12, the adjustable resistor 9 being effective to adjust both reference voltages.

The outputs of the two comparators 12 and 14 are applied to control electrodes or gates of a pair of thyristors 15 and 16 which, as hereinafter described, control the termination of application of current to flashlamps behind windows 3 and 4. In operation, the flashlamp behind window 3 is supplied with operating current simultaneously with energization of the photometric circuit and when the integrated value of the light reaches a certain value, determined by the position of adjustment of the slider of the potentiometer 11, and also determined in part by the resistance of adjustable resistor 9, the comparator 12 develops an output signal which is applied to the gate of the thyristor 15 to cut off current through the flashlamp behind window 3. At the same time, the flashlamp behind window 4 may be energized and when the integrated value of the light reaches a higher value, determined by the resistance of the adjustable resistor 9, the comparator 14 develops an output signal which is applied to the gate of the thyristor 16 to terminate current flow through the lamp behind the window 4. It will be understood that the operation may be reversed, with respect to the sequence of energization of the flashlamps behind windows 3 and 4. Also, additional flashlamps may be provided if desired.

Figure 3:
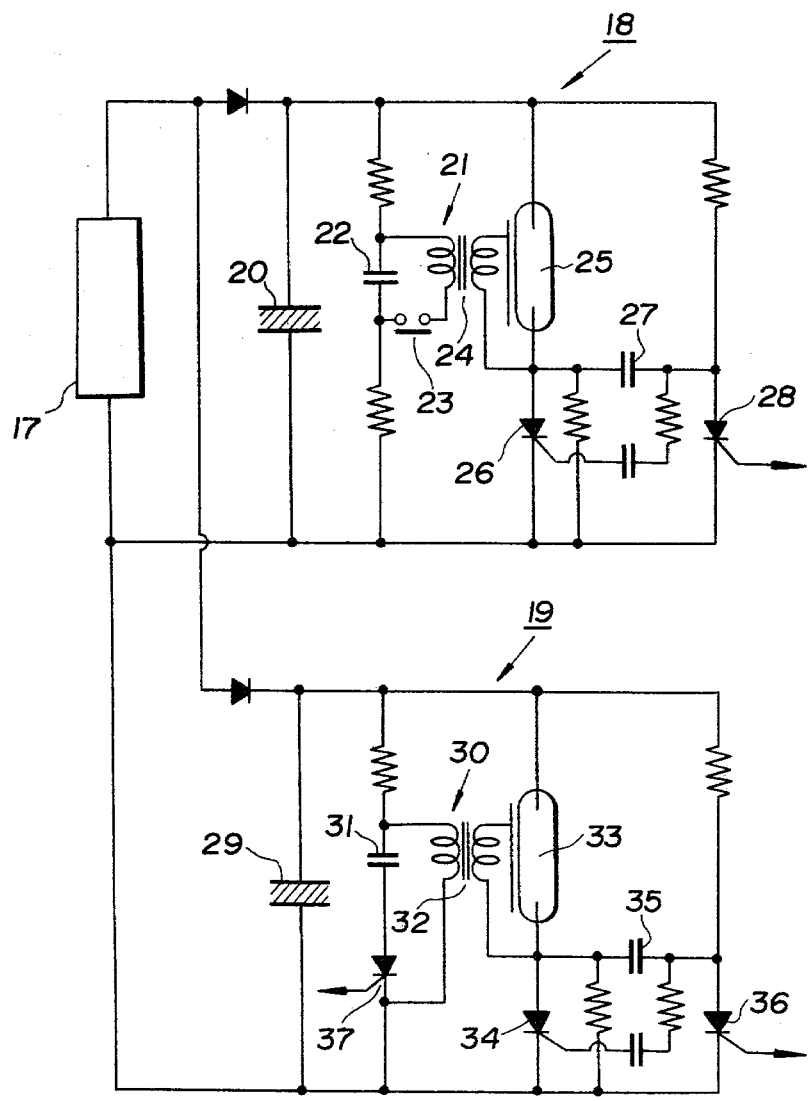
FIG. 3 is a circuit diagram of flashlamp energizing and control circuitry for the unit of FIG. 1.
Figure 4:
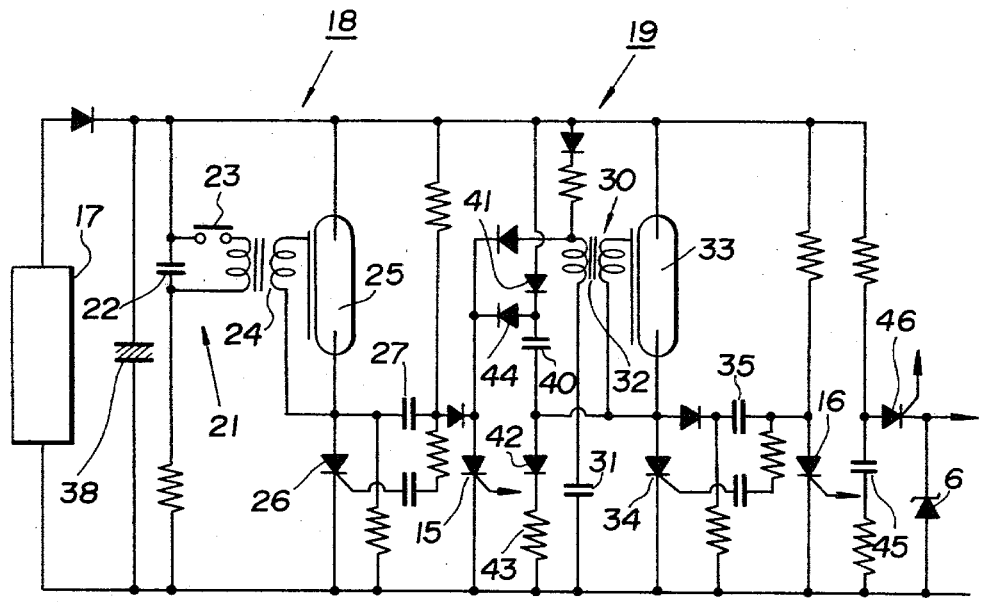
FIG. 4 is a circuit diagram of modified flashlamp energizing and control circuitry.

FIGS. 3 and 4 show embodiments of circuits for energization of flashlamps and for control of current through flashlamps in response to the output signals from the photometric circuit of FIG. 2. In the embodiment of FIG. 3, two series type automatic light control circuits are provided which are of a type known, per se, in the art, both being connected to a common supply voltage source 17 operative to supply a relatively high voltage sufficient for energization of the flashlamps. A circuit 18 is provided which includes a main capacitor 20 for storage of an electrical charge, a trigger circuit 21, trigger capacitor 22, a switch 23 which may be a switch associated with the shutter of a camera or a manual switch adapted to be connected in parallel with a shutter-operated switch, and a trigger transformer 24 connected to a trigger electrode associated with a flashlamp 25. A thyristor 26 is connected in series with the flashlamp 25 and a commutating capacitor 27 is connected between the anode of the thyristor 26 and the anode of another thyristor 28.

The circuit 18 operates in a manner known in the art, the capacitor 20 being discharged through the flashlamp 25 and the thyristor 26 in response to closure of the switch 23. When the thyristor 28 is triggered into conduction, a voltage previously developed across the capacitor 27 is so applied as to place the potential of the anode of the thyristor 26 at a level less than that of its cathode, thereby terminating conduction of current through the thyristor 26 and thereby terminating the application of current to the flashlamp 25.

The circuit 19 is similar to the circuit 18 and includes a main capacitor 29, a trigger circuit 30 including a capacitor 31 and a transformer 32, a flashlamp 33, a first thyristor 34, a commutating capacitor 35 and a second thyristor 36. The circuit 19 differs from the circuit 18, however, in having a thyristor 37 in place of the switch 23.

When the circuit of FIG. 3 is used in conjunction with the photometric circuit of FIG. 2, the thyristor 15 is used as the thyristor 28 and the thyristor 16 is used as the thyristor 36. The gate of the thyristor 37 is so connected that thyristor 37 is triggered into conduction in timed relation to the conduction of current through the flashlamp 25. Preferably, it may be triggered into conduction simultaneously with the conduction of thyristor 15 which is used as thyristor 28 in the circuit of FIG. 3. By way of example, the gate of thyristor 37 may be connected to the output of comparator 12. Thus, the flashlamp 33 is triggered into conduction when the application of current to flashlamp 25 is terminated. This arrangement is desirable from the standpoint of simplifying the circuitry and also from the standpoint of obtaining optimum illumination of the region to be photographed. However, that with appropriate circuitry, the flashlamp 33 might be triggered into conduction prior to termination of conduction through flashlamp 25.

It is also noted that although the illustrated circuitry in FIG. 3 as well as the circuitry in FIG. 4, hereinafter described, are of a type in which the termination of application of current is discontinued by discontinuing conduction through a device in series with a flashlamp, the invention can also be applied to a parallel type of circuit arrangement in which the thyristor or other control element which operates to terminate conduction of current is connected in parallel with the flashlamp.

In FIG. 3, there are two main capacitors 20 and 29 which must have a relatively large size and weight in order to provide sufficient energy for discharge through the flashlamps 25 and 33. The use of separate main capacitors has certain advantages but to reduce size and weight, a modified circuit such as shown in FIG. 4 may be used in which only one main capacitor 38 is provided for energization of both of the flashlamps 25 and 33 of the circuits 18 and 19. The circuits 18 and 19 as shown in FIG. 4 comprise the same elements as described above except that the trigger circuit 30 of the circuit 19 is modified to include a capacitor 40 having one terminal connected through a diode 41 to the positive terminal of the supply 17 and having a second terminal connected to the discharge tube or flashlamp 33 and to the anode of the thyristor 34 and also through a diode 42 and a resistor 43 to the negative side of the supply. The junction between capacitor 40 and diode 41 is also connected through a diode 44 to the anode of the thyristor 15.

In the operation of the circuit of FIG. 4, the switch 23 is closed to trigger the flashlamp 25 into conduction and when the integrated value of the light transmitted to the region to be photographed reaches a certain level, the thyristor 15 is triggered into conduction in the manner as described above in connection with FIG. 3. The conduction of current through the thyristor 26 and flashlamp 25 is then terminated. At this time, the capacitor 40 will be charged to substantially the level of the supply voltage, having been charged through current flow through the diodes 41 and 42 and resistor 43. When the thyristor 15 is triggered into conduction, the trigger circuit 30 operates to trigger the flashlamp 33 into conduction and, at this time, the capacitor 40 is connected in series with the flashlamp 33, and with the voltage developed across the capacitor 38, it being noted that the upper terminal of the capacitor 40 is connected through diode 44 and thyristor 15 to the negative side of the capacitor 38 while the lower terminal of the capacitor 40 is connected to the lower electrode of the flashlamp 33. Thus, the sum of the voltages developed across capacitors 38 and 40 are applied to the discharge tube 33 at the time that the thyristor 15 is triggered into conduction. As a result, even though the capacitor 38 has been partially discharged through conduction through the flashlamp 25, sufficient voltage is applied to the flashlamp 33 to initiate conduction therethrough. Once conduction is initiated, it may continue after discharge of the capacitor 40, through conduction of current from the main capacitor 38 through the thyristor 34. Finally, conduction of current through the flashlamp 33 is discontinued when the thyristor 16 is triggered into conduction.

It is noted that the capacitor 40 thus operates as an auxiliary capacitor for the purpose of augmenting the single main capacitor 38 in insuring conduction through the flashlamp 33. It can be relatively small in size as compared to the main capacitor 38 and, although the capacitor 38 might desirably be somewhat larger in size than either one of the capacitors 20 and 29 of FIG. 3, the overall size and weight can be greatly reduced.

FIG. 4 also illustrates a circuit for supply of an operating voltage to the photometric circuit of FIG. 2, the Zener diode 6 being connected in circuit with a capacitor 45 and an SCR 46 which are connected to the voltage supply 17. The capacitor 45 is normally charged to store sufficient energy to provide an operating voltage to the photometric circuit for a length of time longer than the largest required operating time for the photometric circuit. The SCR is triggered into conduction at the same time that the flashlamp 25 is triggered into conduction and a regulated voltage is developed across the Zener diode 6 for operation of the photometric circuit. Thereafter, the capacitor 45 may be discharged to a level insufficient to maintain conduction through the SCR 46 and then the capacitor 45 is gradually recharged for supply of an operating voltage to the photometric circuit in the next flashing operation.

The circuitry of the invention has an advantage in that features such as incorporated in prior automatic flash units may be readily incorporated if desired. For example, arrangements may be provided for conforming to changes in photographic conditions, as by providing filter means in front of the phototransistor 7 or by providing plural integrating capacitors which may be switched by change over switches. Also, an alarm device may be provided for signalling to the user when the region to be photographed does not produce sufficient reflection of light to produce the proper exposure, such a device being operative in response to the second output signal from the photometric circuit or to the state of discharge termination of the flashlamps.

With the illustrated flash unit of the invention, light from the flashlamp behind the window 3 serves to illuminate the front side of objects within the region to be photographed and light from the flashlamp behind the window 4 is transmitted to and reflected from objects outside the region photographed and transmitted to the region photographed in a manner such as to effectively cancel out any shadows. The photograph obtained is such as obtained with a diffuse light source coming from all directions and from the developed photograph, it cannot be determined that a flashlamp or other artificial light source was used.

The flashing operation is so controlled from the photometric circuit that an optimum exposure is always attained, it being noted that the light is additively measured from the flashing of the plural sections and application of current to the last section to remain operative is terminated exactly when the total integrated value of the light is such as to provide the optimum exposure. The balance between the sections may be controlled by adjustment of the slider of the potentiometer 11 in the illustrated arrangement and may be set according to prevailing conditions. By way of example, if the flashlamps 25 and 33 are respectively located behind the windows 3 and 4, and if the object or region to be photographed is such that a greater amount of reflective or bounce light is required to insure against shadows, the slider of the potentiometer 11 may be moved in a downward direction to obtain less direct light and a greater proportion of bounce light.

Figure 5:
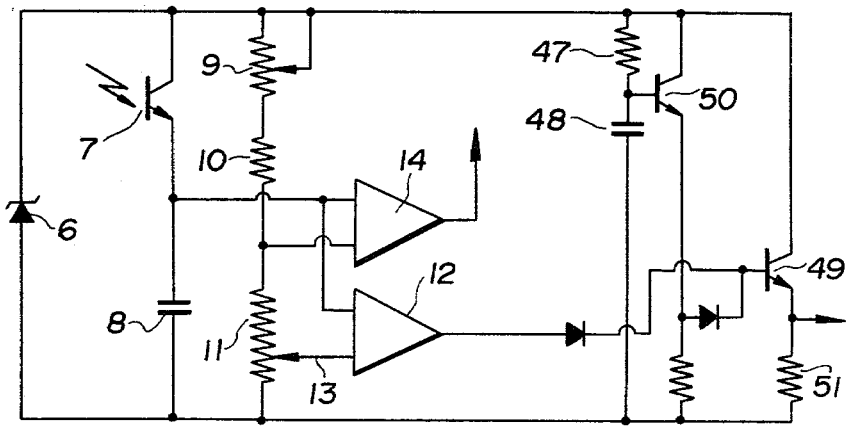
FIG. 5 is a circuit diagram of a modified photometric circuit.

FIG. 5 shows a modified photometric circuit which includes a timing circuit and which is operative to obtain the best possible photograph under adverse lighting conditions, particularly where due to remoteness of an object or where the slider of the potentiometer 11 is adjusted at too high a position, the reflected light is not such as to produce an output from the comparator circuit 12.

In the circuit of FIG. 5, a timer circuit is provided which includes a resistor 47 and a capacitor 48. The circuit also includes transistors 49 and 50 and a resistor 51 connected as shown. When the operating voltage is applied to the photometric circuit, the capacitor 48 starts to charge up through the resistor 47 and when the charge reaches a certain level, a signal is applied from the emitter of transistor 50 to the base of the transistor 49 to develop an output signal at the junction between the emitter of transistor 49 and resistor 51, this output signal being applied to the gate of the thyristor 28 in the circuit of FIG. 3 or the thyristor 15 in the circuit of FIG. 4. The base of the transistor 49 is also coupled through a diode to the output of the comparator circuit 12 and the output signal may be developed from the comparator circuit prior to the development of an output signal from the timer circuit. However, if no output signal is developed by the comparator circuit 12 within a certain time interval, the circuit insures development of such an output signal, to initiate conduction through the second flashlamp as well as to discontinue in a conduction through the first flashlamp. As a result, an exposure which is at least close to the optimum exposure may be attained under adverse conditions in which the second flashlamp might not otherwise have been triggered into conduction.

Preferably, the time interval is so set, as by selection of the values of the resistor 47 and capacitor 48, to be equal to the effective flashing interval of the flashlamp 25, the effective flashing interval being the time interval that should under normal conditions elapse from the initiation of conduction through the flashlamps 25 until the time that the light intensity has decreased to one-third its peak value.

The circuit of FIG. 5 operates to protect against damage to flashlamps and is particularly advantageous in an arrangement in which the flashlamp 25 is smaller in size than the flashlamp 33. It insures that the current to the flashlamp 25 will be terminated at a time such as to avoid potential damage to the flashlamp, the conduction through the flashlamp 33 being then initiated. From the standpoint of cost as well as size and weight, the use of flashlamps of unequal capacity is desirable, one being used as the main light source and the other as an auxiliary. In such a case, however, it is found that damage could result to the smaller flashlamp from the application of excess energy thereto, and the use of a timer circuit, as in the arrangement of FIG. 5, insures against such damage.

Figure 6:
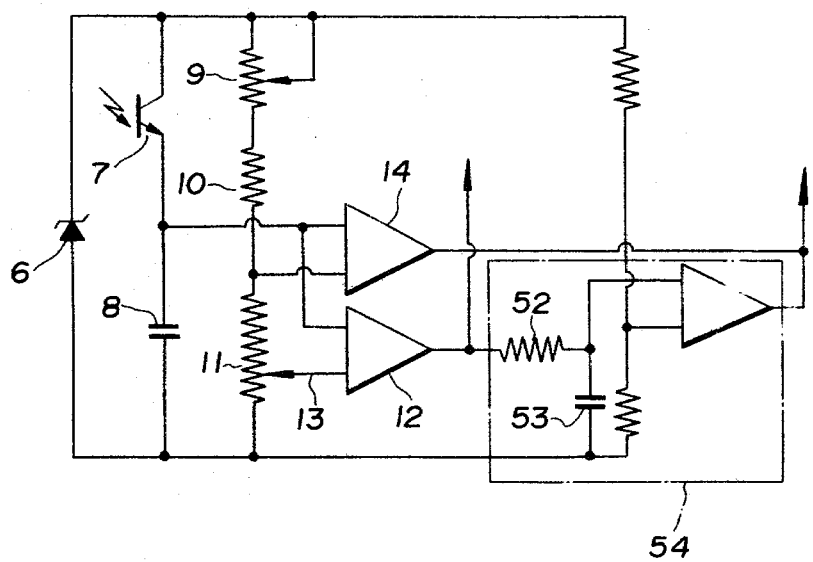
FIG. 6 is a circuit diagram of a further modified photometric circuit.

FIG. 6 shows another modified circuit in which the timing control is applied to the last to conduct flashlamp rather than the first to conduct flashlamp. In the arrangement of FIG. 6, a resistor 52 and a capacitor 53 are included in a circuit 54 which also includes a differential amplifier or comparator, the circuit 54 being connected between the output of the comparator 12 and the output of the comparator 14. A timing operation is initiated when an output signal is developed by the comparator 12 and if at the end of a certain timing interval, no output signal has been developed by the comparator 14, an output signal developed by the circuit 54 will be applied to terminate conduction through the flashlamp 33. With this circuit, the flashlamp 25 may be the main flashlamp with a larger physical size and capacitor while the flashlamp 33 may be an auxiliary flashlamp of smaller size and capacity. It should be noted that the timing circuits such as shown in FIG. 5 and 6 may be used in combination for protection of both flashlamps, in appropriate circumstances.

It will be understood that modifications and variations may be effected without departing from the spirit and scope of the novel concepts of this invention.

I claim:

1. An electronic flash unit for operation in response to an applied trigger signal to illuminate a certain region, comprising: a trigger signal input, a first flashlamp and at least one additional flashlamp for illuminating said certain region, photometric means operative after application of a trigger signal at said input for developing at least two photometric output signals corresponding to light reflected from said certain region, one of said photometric output signals being developed in response to one integrated value of light and another of said photometric output signals being developed in response to another and higher integrated value of light, current supply means, and circuit means for applying currents from said current supply means to said flashlamps, said circuit means including first triggering means coupled to said photometric means for initiating operation of said first flashlamp in response to said one of said photometric output signals, second triggering means coupled to said trigger signal input for initiating operation of said additional flashlamp in response to a trigger signal applied at said input and at a time prior to triggering of said first flashlamp, first terminating means coupled to said photometric means for terminating application of current to said first flashlamp in response to said another of said photometric output signals, and second terminating means coupled to said photometric means for terminating application of current to said additional flashlamp in response to said one of said photometric output signals, said first flashlamp being thereby operative after said additional flashlamp and said first terminating means being thereby operative to terminate application of current to said first flashlamp in response to said another and higher integrated value of light reflected from said region after application of said trigger signal.

2. In an electronic flash unit as defined in claim 1, at least one of said flashlamps being rotatably mounted for selective positioning to illumunate said region through reflection of light from objects outside said region.

3. In an electronic flash unit as defined in claim 1, said current supply means comprising capacitor means for electrical charge storage, and said circuit means including means for discharging said capacitor means through said flashlamps.

4. In an electronic flash unit as defined in claim 3, said capacitor means including a capacitor associated with each flashlamp.

5. In an electronic flash unit as defined in claim 4, said circuit means including separate means for discharging each capacitor through the associated flashlamp.

6. In an electronic flash unit as defined in claim 4, said circuit means being operative to connect the capacitor associated with said first flashlamp in series with an additional capacitor associated with an additional flashlamp to use charge stored in said additional capacitor to supply current to said first flashlamp.

7. In an electronic flash unit as defined in claim 1, said circuit means being operative to apply current to said first flashlamp after termination of application of current to said additional flashlamp.

8. In an electronic flash as defined in claim 7, said circuit means further including timer means operatively associated with said second terminating means and said first triggering means and operative after elapse of a certain time interval following an applied trigger signal for then insuring termination of application of current to said additional flashlamp and initiation of application of current to said first flashlamp regardless of the present integrated value of reflected light.

9. In an electronic flash as defined in claim 7, said circuit means including timer means operatively associated with said first terminating means operative after elapse of a certain time interval following termination of current to said additional flashlamp for then insuring termination of current to said first flashlamp regardless of the present integrated value of reflected light.

10. In an electronic flash unit as defined in claim 1, adjustment means for adjusting said another and higher integrated value of light at which said another of said photometric output signals is developed.

11. In an electronic flash unit as defined in claim 10, adjustment means for adjusting said one integrated value of light at which said one of said photometric output signals is developed.

* * * * *

UNITED STATES PATENT AND TRADEMARK OFFICE
CERTIFICATE OF CORRECTION

PATENT NO. : 4,360,764
DATED : November 23, 1982
INVENTOR(S) : HIDEO YAGI

It is certified that error appears in the above-identified patent and that said Letters Patent are hereby corrected as shown below:

Column 2, line 33, "rtimer" should be "timer".

Column 4, line 6, after "21", insert -- a --.

Column 7, line 19, "flashlamps" should be "flashlamp".

Column 7, line 51, "capacitor" should be -- capacity --.

Column 7, line 54, "FIG." should be "FIGS."

Signed and Sealed this

Eighth Day of February 1983

[SEAL]

Attest:

GERALD J MOSSINGHOFF

Attesting Officer     Commissioner of Patents and Trademarks